United States Patent
Hoevesteen (10) Patent No.: US 8,744,105 B2
(45) Date of Patent: *Jun. 3, 2014

(54) HEARING AID WITH ADAPTIVE BULK BIASING POWER MANAGEMENT

(75) Inventor: Per Flemming Hoevesteen, Maalov (DK)

(73) Assignee: Widex A/S, Lynge (DK)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,503

(22) Filed: Sep. 14, 2012

(65) Prior Publication Data

US 2013/0064407 A1 Mar. 14, 2013

Related U.S. Application Data (62) Division of application No. 12/675,921, filed as application No. PCT/EP2010/052477 on Feb. 26, 2010, now Pat. No. 8,280,089.

(51) Int. Cl.
 *H04R 25/00* (2006.01)
(52) U.S. Cl.
 USPC .......................... 381/323; 381/312; 381/314
(58) Field of Classification Search
 USPC .................. 381/312, 314–317, 320–321, 323
 See application file for complete search history.

(56) References Cited

U.S. PATENT DOCUMENTS

| | | | |
|---|---|---|---|
| 5,506,532 A | 4/1996 | Milazzo | |
| 7,307,858 B2 | 12/2007 | Kuratli | |
| 7,504,876 B1 | 3/2009 | Raghavan et al. | |
| 2006/0017467 A1 | 1/2006 | Lai | |
| 2009/0108888 A1 | 4/2009 | Gebara et al. | |
| 2009/0279719 A1 | 11/2009 | Lesso | |

FOREIGN PATENT DOCUMENTS

WO 0150812 A1 7/2001

OTHER PUBLICATIONS

The Shichman-Hodes Enhancement MOSFET Model and SwitcherCAD III SPICE, Report NDT14-08-2007, Aug. 12, 2007, pp. 1-19.
International Search Report for PCT/EP2010/052477 dated Jul. 8, 2010.

*Primary Examiner* — Suhan Ni
(74) *Attorney, Agent, or Firm* — Sughrue Mion, PLLC (57) ABSTRACT

A power management system for a digital processing core of a battery-powered hearing aid is adapted for providing power to the hearing aid circuit in a particularly efficient manner. The power management system comprises a first linear voltage regulator, and a second linear voltage regulator in series with a switched-capacitor 2:1 SC converter, a positive bulk biasing voltage supply, and a negative bulk biasing voltage supply, for controlling the switching speed, threshold voltage, and current leak from the semiconductor elements of the digital processing core when the core is operated at the reduced voltage provided by the power management system. The power management system may save between 50% and 70% of the power consumed by the digital processing core of the hearing aid circuit. The invention further provides a method for providing a supply voltage to a digital hearing aid.

18 Claims, 6 Drawing Sheets

HEARING AID WITH ADAPTIVE BULK BIASING POWER MANAGEMENT

CROSS-REFERENCE TO RELATED APPLICATIONS

This application is a Divisional of U.S. application Ser. No. 12/675,921 filed Apr. 21, 2011, which is a 371 of PCT Application No. PCT/EP2010/052477 filed Feb. 26, 2010, the disclosures of which are incorporated in their entirety herein.

TECHNICAL FIELD

This application relates to hearing aids. More specifically it relates to battery-powered hearing aids comprising switch mode power converters.

BACKGROUND OF THE INVENTION

1. Field of the Invention

In the context of this application, a hearing aid is an electronic device for alleviating a hearing loss of a human. Being small enough to be worn in or behind the ear, the hearing aid picks up sounds from the environment using one or more microphones and amplifies the sounds electrically according to a hearing aid prescription. Contemporary hearing aids rely heavily on digital signal processing, whereby the electrical signals from the hearing aid microphones are converted into digital signals by a digital signal processor present in the hearing aid, and digital representations of the amplified signals are converted back into electrical signals suitable for driving an output transducer of the hearing aid, said transducer converting the electrical signals into sound waves perceivable to the hearing aid user.

The parts of the hearing aid performing the digital processing of audio signals in the hearing aid, in the following denoted the digital processing core, consumes a significant amount of the total power in a contemporary hearing aid, i.e. up to 50% or more of the total available power, mainly due to the increase in circuit complexity. This complexity is the result of the increasing amount of functions and the still more advanced digital processing each generation of hearing aids are designed to perform.

Part of the solution to the increase in complexity has been a decrease in microelectronic chip technology scale, with current designs utilizing sub-micron chip fabrication processes below 130 nanometers or smaller. The smaller technology scale implies an inherent decrease in power consumption, but also allows for the implementation of larger and more complex circuits, which, in turn, consume yet more power. Before introduction of the sub-micron processes, the threshold voltage $V_t$ of MOS transistors decreased with the process scale. In sub-micron processes, however, this is not the case because of an increase in leakage current in these technologies. The sub-micron process technologies thus have relatively high Vt and are comparatively slower.

Recently, special low-$V_t$ MOS technologies have become available to chip designers. Low-$V_t$ MOS transistors are capable of operating at a higher speed, and may be freely mixed in chip designs with high-$V_t$ MOS transistors. High-$V_t$ MOS transistors are comparatively slower than low-$V_t$ transistors, need a higher supply voltage in order to operate, and they are typically used for low-power applications, whereas the low-$V_t$ transistors may operate at a lower supply voltage, but have a higher current leakage than the high-$V_t$ transistors.

Battery cells for hearing aid applications are usually of the zinc-air variety, and have a standard voltage ranging from 1.6 volts (when new) to about 1.0 volts (when almost depleted), and a nominal voltage of 1.2 volts. If MOS transistors with a low $V_t$ are to be used, such transistors may be operated at a very low voltage, e.g. about 500 mV, but the current leakage from the transistors is fairly high, and the gain is lower. At such a low voltage transistors also have a reduced speed capability.

A substantial amount of power may be saved by running a circuit at a voltage of 500 mV, but although low-$V_t$ transistors may operate at 500 mV at the same speed as high-$V_t$ transistors operating at 700 mV, the problem of current leak and gain has to be solved if any significant amount of power is to be saved. The power consumption of a microelectronic circuit is proportional to the supply voltage squared. If the supply voltage is lowered from 700 mV to 500 mV, the reduction in power consumption yielded from this operation is about 50%.

2. The Prior Art

A practical way of providing a suitably low supply voltage for low-$V_t$ transistors is to use a switched-capacitor voltage converter to scale down the voltage to the 500 mV needed by the low-$V_t$ MOS transistors. A 2:1 switched-capacitor voltage converter is particularly simple to implement, taking up very little space on the circuit chip. A switched-capacitor voltage converter consumes no significant power in itself, provides a very stable voltage reduction, has an optimal power transfer configuration, and a 2:1 voltage converter provides the necessary headroom for a 1.2 volt battery to be able to drive the digital processing core at 500 mV during the major part of the battery lifetime.

A 2:1 switched-capacitor voltage converter requires a stable input voltage twice the output voltage, and is therefore only capable of providing sufficient power to a hearing aid circuit if the battery voltage is sufficiently high to provide this voltage in a stable manner. A linear voltage regulator capable of feeding the switched-capacitor voltage converter from the battery may be configured to provide the stable reference voltage even if the battery voltage varies.

Powering a MOS transistor circuit at a lower voltage means that the transistors operate close to their Vt, which results in a high increase in the statistical spread on various transistor parameters from one device to another. Inherently, the sub-micron processes result in a greater parameter spread due to the reduced physical dimensions of the semiconductor elements, but the effect is even greater when operating at low voltages.

One of the transistor parameters is the drive strength or gain, i.e. the ability of the semiconductor element to amplify a signal, or, in a digital circuit, the ability to start drawing current when a voltage is present on the MOS transistor gate. If the spreading of drive strength is too large, the behaviour of the actual circuit may be very different from the design specifications, and large variations in parameters from one circuit to the next may reduce the useful die yield from a single wafer to an unacceptably low percentage, significantly increasing production costs. Especially, the parameters determining the timing constants of the individual transistors are critical. It would thus be beneficial to be able to reduce parameter spread in low-voltage MOS transistor circuits in an effective and simple manner.

If MOS transistors with a high Vt are used, there is a limit in their switching frequency at low voltages. This limits the useable clock frequency, and thus the complexity of the signal processing that may be performed by a hearing aid designed using this technology. In order to reduce spread and current leak, it is possible to adjust the bulk voltage potential of high-$V_t$ transistors even when operating at 500 mV, but at the risk of compromising stable operation. If the difference between the bulk voltage potential and the source terminal voltage potential becomes large enough, the PN-junction constituting these two semiconductor layers of the MOS transistor may start to conduct current, effectively turning the PN junction into a diode short-circuit within the MOS transistor, leading to possible erratic circuit behavoiur.

If a microelectronic circuit of this kind is to be useable when powered at a supply voltage of 500 mV, it is highly beneficial to use MOS transistors having a low $V_t$. The aforementioned problems associated with low-voltage circuits may then be alleviated by controlling the bulk voltage potentials of the MOS transistors. This technique involves increasing the bulk voltage potential above the positive supply voltage for PMOS transistors and decreasing the bulk voltage potential below the negative supply voltage for NMOS transistors on the same circuit chip. This adjustment of the bulk voltage potential, which may be performed dynamically in an adaptive manner, has the effect of increasing the threshold voltage $V_t$ of the transistors, and thus decrease the switching speed and current leakage. If the $V_t$ is adjusted to be at the same level in all transistors, the parameter spread due to process and temperature is reduced, too.

The threshold voltage $V_t$ for an NMOS transistor, denoted the body effect of MOS transistors, may be expressed as:

$$V_t = V_{t0} + \gamma(\sqrt{2\Phi_f + V_{SB}} - \sqrt{2\Phi_f})$$

where $V_{t0}$ is the threshold voltage at 0 volts, $V_{SB}$ is the voltage potential between the source terminal and bulk, $\Phi_f$ is the surface voltage potential, and $\gamma$ is the bulk threshold voltage potential. It may be shown that if $\Phi_f$, $V_{t0}$ and $\gamma$ are greater than zero, then $V_t$ will increase if $V_{SB}$ is increased for the NMOS transistor. Similarly, it may be shown that $V_t$ will decrease if $V_{SB}$ is decreased for a PMOS transistor.

WO-A1-01/50812 discloses a hearing aid having a switched-capacitor step-down voltage converter for providing certain parts of a digital hearing aid circuitry with a lower voltage than the nominal battery voltage. Although this step-down voltage converter in itself provides some power saving, it still draws a considerable amount of current from the battery when the battery is near depletion. Some critical parts in the hearing aid, e.g. the output converter for the hearing aid output transducer, cannot be powered at low voltages. A practical way of supplying power to a hearing aid over a wider range of battery voltages would thus be appreciated.

U.S. Pat. No. 7,307,858 B2 discloses an adaptive power supply circuit for use in a battery-powered, head worn communication device. The power supply circuit comprises a 2:3 switched-capacitor voltage converter and a linear voltage regulator. When the battery voltage is below 1.2-1.25 V, both the linear voltage regulator and the 2:3 switched-capacitor voltage converter provides the output voltage $V_o$. The 2:3 switched-capacitor voltage converter provides the lower voltage from the battery voltage by switching a network of capacitors at an adaptive clock frequency dependent on the load current. When the battery voltage falls below 1.2 V, the 2:3 switched-capacitor voltage converter is able to supply less and less current for the load. At a battery voltage of 3/2 of $V_o$, the switched-capacitor voltage converter is incapable of supplying the load with the necessary current, itself becoming more of a load to the linear voltage regulator, which as a consequence has to provide more and more of the power to the load as the battery voltage decreases.

If the battery voltage in this prior art circuit gets above the operative threshold, the switched-capacitor voltage converter decreases its switching frequency because the load current increases. This implies, in a first instance, that the total current drawn from the battery has an optimal value only at a battery voltage around $$V_{bat} \approx R_o \cdot I_L + \left(\frac{3}{2}\right) V_{DD}$$

and, in a second instance, that the switching frequency has to vary considerably in order to control the output voltage. The optimal point is thus at the maimal clock frequency. The first complication is that current drawn from the battery has a very narrow minimum value range around the operative threshold. The second complication is the variable frequency controlling the switched-capacitor voltage converter. Although this method of operating a switched-capacitor voltage converter allows for a very wide output voltage range, it would undoubtedly introduce interference frequencies into the circuit. These frequencies would occur arbitrarily in different parts of the circuit, and would be very difficult to eliminate, as they depend on the switching frequency, which again depends on the load current of the circuit.

U.S. Pat. No. 7,504,876 B1 discloses a substrate bias feedback control circuit for use in a microelectronic circuit. The purpose of the bias feedback control circuit is to reduce current leakage in a microelectronic circuit operating at a low voltage, e.g. 0.5-1 V, by controlling the bias voltage potential on the well or substrate of the microelectronic circuit. The bias feedback control circuit consists of two partial circuits, one circuit for controlling a negative bias voltage for a set of NMOS transistors, and one circuit for controlling a positive bias voltage for a set of PMOS transistors.

If a hearing aid circuit were proposed solely having means for controlling the bulk bias voltage potentials of the MOS transistors in the hearing aid circuit, no significant power would be saved. Although the leak currents of the MOS transistors would be decreased, the circuit would still lack means for decreasing the supply voltage in an energy-efficient manner.

SUMMARY OF THE INVENTION

The invention, in a first aspect, provides a hearing aid, said hearing aid having a battery and a microelectronic circuit, said circuit comprising a digital processing core including PMOS transistors and NMOS transistors, a power supply powered by the battery and providing a supply voltage for the digital processing core, a positive bulk biasing voltage generator and a negative bulk biasing voltage generator, the power supply having a controller for controlling the supply voltage, a first output branch having a first linear voltage regulator, a second output branch having a second linear voltage regulator in series with a 2:1 switched-capacitor voltage converter, the positive bulk biasing voltage generator adapted for providing a bias voltage to the positive bulk of the PMOS transistors of the digital processing core, and the negative bulk biasing voltage generator providing a bias voltage to the negative bulk of the NMOS transistors of the digital processing core, suitable for optimizing parameters of the transistors, the controller being adapted for comparing the battery voltage against a first and a second predetermined limit and causing the power supply to provide the supply voltage by the first output branch when the battery voltage is below the first, predetermined limit, by the first output branch in combination with the second output branch when the battery voltage is above the first, predetermined limit and below the second, predetermined limit, and by the second output branch when the battery voltage is above the second, predetermined limit.

One benefit obtained from this configuration is a hearing aid with a digital core capable of being operated at a nominal supply voltage of about 500 mV and a clock frequency up to 10 MHz, which is sufficiently fast for performing the signal processing demands of a contemporary hearing aid. Another benefit is the simplicity and efficiency of utilizing a 2:1 switched-capacitor voltage converter to provide the supply voltage.

The invention, in a second aspect, provides a method of providing a supply voltage to a digital hearing aid circuit, said method comprising the step of providing a battery, generating a first regulated voltage, generating a second regulated voltage, generating half of the second regulated voltage, generating a first bulk biasing voltage, generating a second bulk biasing voltage, applying the first bulk biasing voltage to a first bulk terminal of the hearing aid circuit, applying the second bulk biasing voltage to a second bulk terminal of the hearing aid circuit, and deriving the supply voltage for the digital hearing aid circuit, the supply voltage being derived from at least one of the first regulated voltage and half of the second regulated voltage, wherein the step of deriving the supply voltage incorporates a step of determining the voltage of the battery.

Further features and advantages will appear from the dependent claims.

BRIEF DESCRIPTION OF THE DRAWINGS

The invention will now be described in further details with respect to the drawings, where.

DETAILED DESCRIPTION OF THE INVENTION

Figure 1:
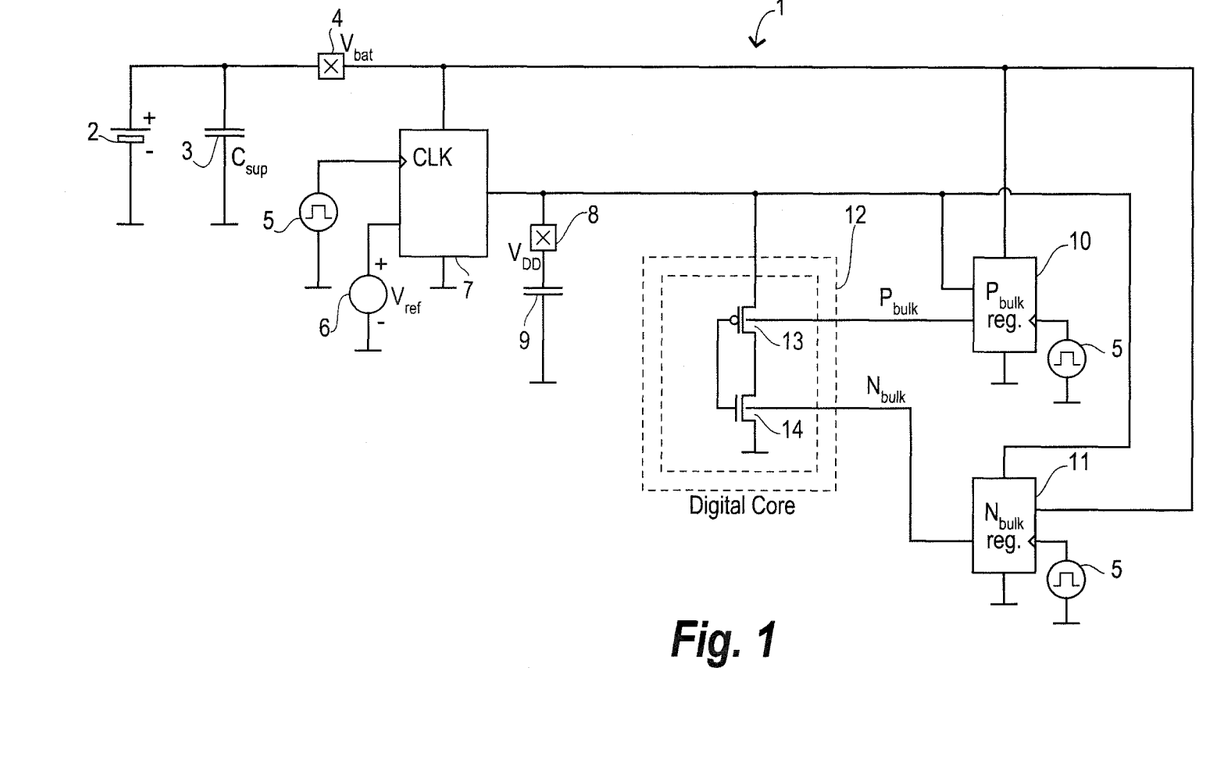
FIG. 1 is a schematic showing a power management system for a hearing aid according to the invention.

FIG. 1 is a schematic of a power management system 1 for a hearing aid according to the invention. The power management system comprises a battery 2, a battery decoupling capacitor 3, a battery voltage node 4, a master clock source 5, a reference voltage source 6, a supply voltage regulator 7, a supply voltage node 8, a load decoupling capacitor 9, a P bulk bias voltage regulator 10, and an N bulk bias voltage regulator 11. In FIG. 1 is also shown a digital processor core 12 comprising a PMOS transistor 13 and an NMOS transistor 14.

The purpose of the power management system 1 is to minimize power consumption in a hearing aid circuit by providing the digital processor core 12 with a stable supply voltage while keeping the timing spread and current leakage of the MOS transistors 13 and 14 as low as possible. In an actual digital processor core circuit in a hearing aid, the number of individual MOS transistors may exceed hundreds of thousands or even several millions, but in the digital processor core 12 shown in FIG. 1 only a single PMOS transistor 13 and a single NMOS transistor 14 is illustrated for clarity.

The battery 2 provides electric power for the power management system 1 via the battery voltage node 4. The battery decoupling capacitor 3 decouples and stabilizes the voltage potential from the battery 2, and the battery 2 provides the voltage potential $V_{bat}$ of the battery voltage node 4 for the supply voltage regulator 7, the P bulk bias voltage regulator 10, and the N bulk bias voltage regulator 11. The supply voltage regulator 7 provides the supply voltage potential $V_{DD}$ for the digital processor core 12, which is also used as a reference voltage by the P bulk bias regulator 10 and the N bulk bias regulator 11. The P bulk bias regulator 10 and the N bulk bias regulator 11 uses $V_{bat}$ for supply voltage. The supply voltage is decoupled, stabilized and conditioned by the load decoupling capacitor 9. In preferred embodiments, a battery voltage potential $V_{bat}$ of between 0.9 volts and 1.6 volts is preferred, and the voltage potential $V_{DD}$ is significantly lower than the battery voltage potential $V_{bat}$, usually about 0.5 volts.

The supply voltage regulator 7 utilizes the battery voltage potential $V_{bat}$, the master clock source 5 and the reference voltage source 6 in order to generate a stable supply voltage $V_{DD}$ for the digital processor core 12. The P bulk bias voltage regulator 10 and the N bulk bias voltage regulator 11 utilizes the power supply voltage potential $V_{DD}$, the battery voltage potential $V_{bat}$ and the master clock source 5, in order to generate the voltage potential $N_{bulk}$ for the NMOS transistor 14 and the voltage potential $P_{bulk}$ for the PMOS transistor 13, respectively.

The voltage potential $P_{bulk}$ from the P bulk bias voltage regulator 10 is used to control the transistor parameters threshold voltage $V_t$ and current leakage $I_{Pleak}$ of the PMOS transistor 13. Increasing the P bulk bias voltage potential $P_{bulk}$ to a value above the supply voltage potential $V_{DD}$ results in an increase in $V_t$, and a decrease in Sp and $I_{Pleak}$. The voltage potential $P_{bulk}$ from the P bulk bias voltage regulator 10 is adjusted in such a way that $V_t$ and gain for the PMOS transistor 13 arrives at a value where parameter spread is minimized.

Thus, leakage current may be decreased by raising the P bulk bias voltage potential $P_{bulk}$ for the PMOS transistor 13 to a value above the supply voltage potential $V_{DD}$, thereby increasing $V_t$ to a level where the gain of the PMOS transistor 13 is sufficient without being too high.

In a similar way, leakage current may be decreased by lowering the N bulk bias voltage potential $N_{bulk}$ for the NMOS transistor 14 to a value below the zero voltage potential $V_{SS}$, thereby increasing $V_t$ to a level where the gain of the NMOS transistor 14 is sufficient without being too high. The voltage potential $N_{bulk}$ from the N bulk bias voltage regulator 11 is used to control the transistor parameters threshold voltage $V_t$ and current leakage $I_{Pleak}$ of the NMOS transistor 14. Decreasing the N bulk bias voltage potential $P_{bulk}$ to a value below the zero voltage potential $V_{SS}$ results in an increase in $V_t$, and a decrease in $I_{Pleak}$. Thus, leakage current may be decreased, and the gain of the NMOS transistor 14 improved, by lowering the N bulk bias voltage potential $N_{bulk}$ for the NMOS transistor 14 to a value below the zero voltage potential $V_{SS}$.

Figure 2:
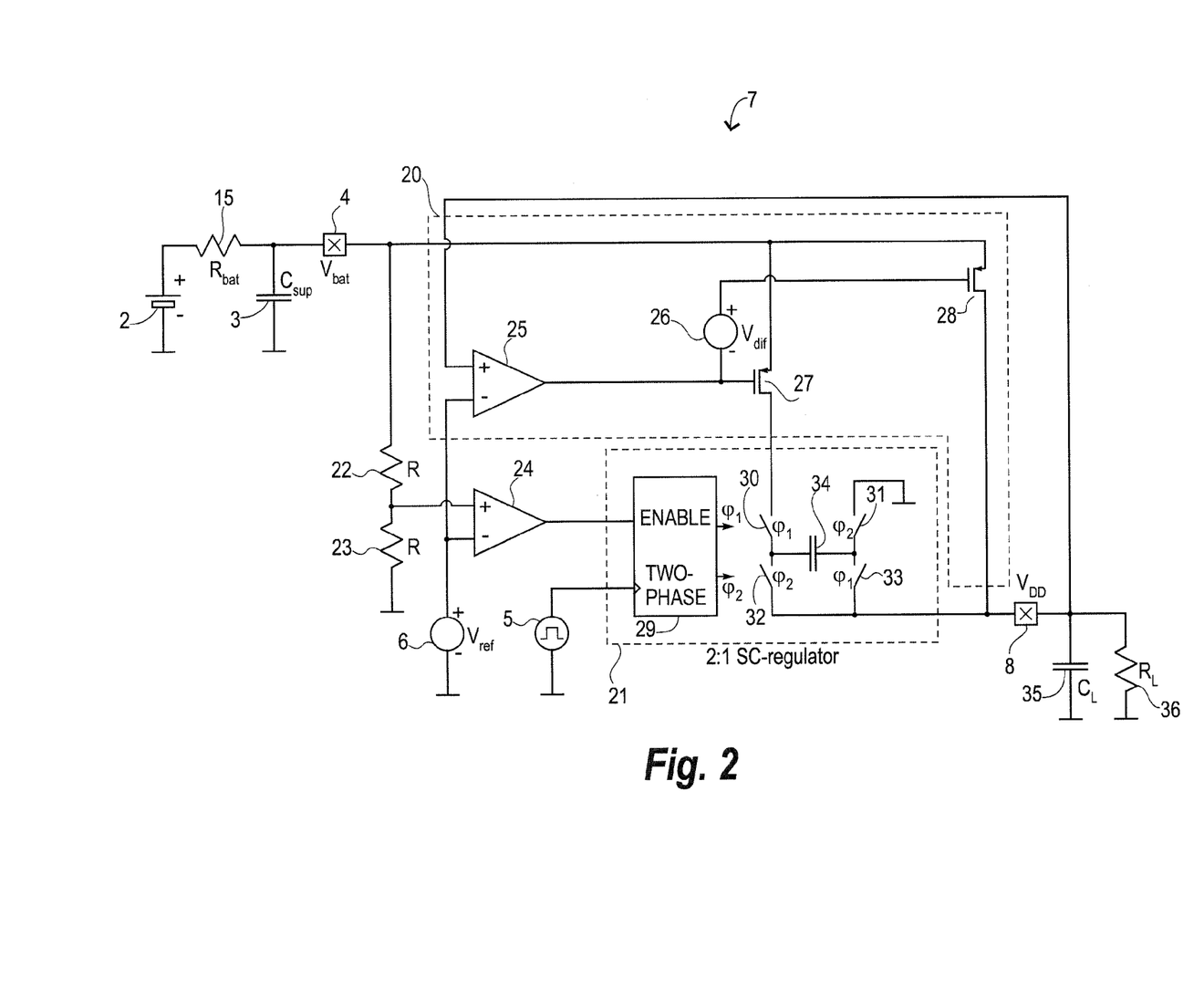
FIG. 2 is a detailed schematic of the voltage regulator for the power management system shown in FIG. 1.

FIG. 2 shows a more detailed schematic of the supply voltage regulator 7 shown in FIG. 1. The supply voltage regulator 7 comprises a voltage divider consisting of a first resistor 22 and a second resistor 23, a voltage comparator 24, a linear voltage regulator 20 and a 2:1 switched-capacitor voltage converter 21. The linear voltage regulator 20 comprises an operational amplifier 25, a voltage difference source 26, a first PMOS transistor 27, and a second PMOS transistor 28. The 2:1 SC voltage converter 21 comprises a two-phase switch controller block 29, a first switch 30, a second switch 31, a third switch 32, a fourth switch 33, and a switching capacitor 34. Also shown in FIG. 2 is the battery 2, an internal battery resistance 15, the decoupling capacitor 3, the battery voltage node 4, the voltage reference source 6, the master clock source 5, the supply voltage node 8, a load decoupling capacitor 35, and a load resistance 36.

The battery 2 provides the necessary power for the supply voltage regulator 7 via the internal battery resistance 15 and the battery voltage node 4. The decoupling capacitor 3 stabilizes the voltage from the battery 2. The battery voltage node 4 carries the voltage potential $V_{bat}$, which is used for a reference voltage by the voltage divider. The two resistors 22, 23, respectively, of the voltage divider, provide the positive input of the comparator 24 with the voltage potential $V_{bat}/2$, and the voltage reference source 6 provides the reference voltage potential $V_{ref}$ to the negative input of the comparator 24. The output of the comparator 24 is connected to an ENABLE input of the two-phase switch controller block 29 of the 2:1 SC voltage converter 21. The purpose of the comparator 24 and the voltage divider is to disable the 2:1 SC voltage converter 21 whenever the battery voltage falls below $2*V_{DD}$.

The supply voltage regulator 7 provides power to the digital processor core of the hearing aid, illustrated in FIG. 2 by the equivalent load resistance 36, in the form of the voltage potential $V_{DD}$. Whenever the voltage potential $V_{bat}$ of the battery 2 is above a reference voltage equal to $2*V_{ref}$, the voltage potential $V_{DD}$ is solely provided by the first PMOS transistor 27 via the 2:1 SC voltage converter 21. If the voltage potential $V_{bat}$ is between $2*V_{ref}$ and $$2 \cdot V_{ref} + \frac{I_L}{2 fC},$$

where $I_L$ is the load current, f is the master clock frequency, and C is the circuit capacitance, the second PMOS transistor 28, and the first PMOS transistor 27, via the 2:1 SC voltage converter 21, share the power delivered to the supply voltage node 8. If the battery voltage potential $V_{bat}$ falls below $2*V_{ref}$, e.g. whenever the battery 2 nears depletion, the 2:1 SC voltage converter 21 is shut off completely by the comparator 24, and the second PMOS transistor 28 takes over, providing the necessary power to the hearing aid. This measure is taken in order to prevent the 2:1 SC voltage converter 21 from acting as an extra load to the linear voltage regulator 20.

The purpose of the linear voltage regulator 20 and the 2:1 switched-capacitor 21 is to ensure that a constant voltage $V_{DD}$, equal to $V_{ref}$, is available to the load 36 via the output node 8 at all times. The linear voltage regulator 20 may be seen as comprising two output branches, the first branch comprising the operational amplifier 25, the voltage generator 26 and the second PMOS transistor 28, and the second branch comprising the operational amplifier 25, the first PMOS transistor 27 and the 2:1 switched-capacitor voltage converter 21. The output node 8 has a connection back to one terminal of the operational amplifier 25, effectively forming a feedback loop for regulating the output voltage $V_{DD}$ in a manner which is explained in more detail in the following.

When $V_{bat}$ is greater than $2 \cdot V_{DD} + I_L/(2 \cdot f \cdot C)$, the feedback loop goes through the first PMOS transistor 27 and the 2:1 switched-capacitor voltage converter 21 to the output node 8. The battery voltage Vbat is converted to the voltage $V_{bat} - 2 \cdot V_{DD} + I_L/(2 \cdot f \cdot C)$ across the first PMOS 27, and this voltage is then converted down to $V_{DD}$ across the 2:1 switched-capacitor voltage converter 21, where the voltage $I_L/(2 \cdot f \cdot C)$ may be regarded as a resistive loss due to the output impedance of the 2:1 switched-capacitor voltage converter.

When $V_{bat}$ is greater than $2 \cdot V_{DD}$, but less than $2 \cdot V_{DD} + I_L/(2 \cdot f \cdot C)$, the feedback loop goes through both the first PMOS transistor 27 and the 2:1 switched-capacitor voltage converter 21 and the second PMOS transistor 28 to the output node 8. The 2:1 switched-capacitor voltage converter 21 is delivering as much of the current for the output node 8 as possible, but is limited by its finite output impedance. Thus, the remaining current is delivered through the second PMOS 28 in order to keep $V_{DD}$ constant. The amount of current delivered through the second PMOS 28 is controlled by the voltage source 26, keeping a voltage difference of $V_{dif}$ between the input of the first PMOS 27 and the input of the second PMOS 28. The transision from the state where $V_{bat}$ is greater than $2 \cdot V_{DD} + I_L/(2 \cdot f \cdot C)$ happens gradually around $V_{bat} = 2 \cdot V_{DD} + I_L/(2 \cdot f \cdot C)$.

When $V_{bat}$ is less than $2 \cdot V_{DD}$, the 2:1 switched-capacitor voltage converter 21 is shut down by the comparator 24 because the potential on the positive terminal of the comparator 24 is below $V_{ref}$. If the 2:1 switched-capacitor voltage converter 21 was kept enabled in this case, it would act as an extra load on $V_{bat}$, and $V_{DD}$ would fall unacceptably. In this case the feedback loop goes solely through the second PMOS 28, which thus delivers all the current to the output node 8.

Whenever the voltage potential $V_{bat}/2$ on the positive input of the comparator 24 is larger than the voltage potential $V_{ref}$ on the negative input of the comparator 24, the output of the comparator 24 is high, activating the 2:1 SC voltage converter 21 via the two-phase switch controller block 29. When activated, the two-phase switch controller block 29 controls the four switches 30, 31, 32, 33, respectively, synchronized by the master clock source 5, providing a non-overlapping clock signal to the four switches 30, 31, 32, 33, respectively.

On a first clock pulse from the master clock source 5, the two-phase switch controller block 29 enables the control signal $\phi_1$, which opens the second switch 31 and the third switch 32, respectively, and closes the first switch 30 and the fourth switch 33, respectively, connecting the first terminal of the switching capacitor 34 to $V_{bat}$ via the first PMOS transistor 27, and the second terminal of the switching capacitor 34 to the load resistance 36 via the supply voltage node 8. The switching capacitor 34 forms a serial capacitance together with the load decoupling capacitor 35, providing a current $I_L$ to the load resistance 36.

On a second clock pulse from the master clock source 5, the two-phase switch controller block 29 enables the control signal $\phi_2$, which opens the first switch 30 and the fourth switch 33, respectively, and closes the second switch 31 and the third switch 32, respectively, connecting the first terminal of the switching capacitor 34 to the load resistance 36 via the supply voltage node 8 and the second terminal of the switching capacitor 34 to ground. The switching capacitor 34 now forms a parallel capacitance together with the load decoupling capacitor 35, providing the current $I_L$ to the load resistance 36.

By enabling the control signals $\phi_1$ and $\phi_2$, respectively, in an alternating fashion, the voltage potential $V_{DD}$ is provided to the supply voltage node 8 by the 2:1 SC voltage converter 21, providing the current $I_L$ to the load resistance 36. As long as the comparator 24 enables the 2:1 SC voltage converter 21, the current $I_L$ may flow from the output of the 2:1 SC voltage converter 21 through the load resistance 36. The more the voltage potential $V_{bat}$ of the battery 2 drops below $$2 \cdot V_{ref} + \frac{I_L}{2fC},$$

the more the linear voltage regulator 20 contributes to the total power consumption. If the voltage potential $V_{bat}$ of the battery 2 drops below $2*V_{ref}$, the 2:1 SC voltage converter is disabled by the comparator 24 in order to prevent it from drawing any load current by itself. This, in effect, causes the linear regulator 20 to provide all the available power to the load resistance 36.

The 2:1 switched-capacitor voltage converter 21 in FIG. 2 provides a 2:1 voltage conversion of the input voltage, plus the voltage difference due to the converter output impedance $V_{SC}=I_L/(2 \cdot f \cdot C)$, plus the voltage difference from the first PMOS transistor 27 in order to generate the supply voltage $V_{DD}$ needed for the operation of the digital processor core of the hearing aid. The principle of operation is illustrated by FIG. 3 and FIG. 4, and is explained in greater detail in the following.

Figure 3:
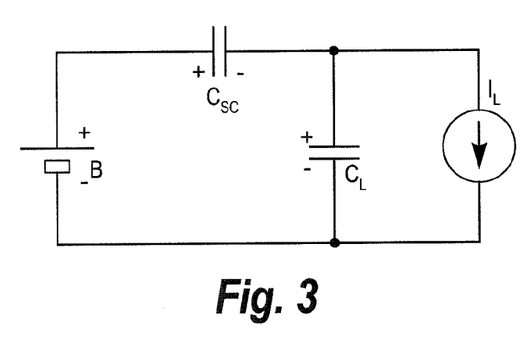
FIG. 3 is a schematic showing a first phase in a 2:1 switched-capacitor DC-DC-converter.

FIG. 3 shows the first phase in a 2:1 switched-capacitor 2:1 SC voltage converter circuit comprising a battery B, a first capacitor $C_{SC}$, a second capacitor $C_L$ and an independent current source $I_L$. The battery B builds up a charge in the first capacitor $C_{SC}$ while the second capacitor $C_L$ is discharged through the independent current source $I_L$.

Figure 4:
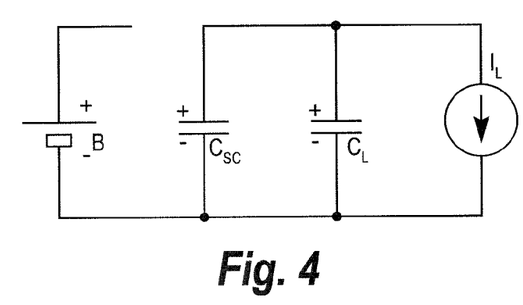
FIG. 4 is a schematic showing a second phase in the converter shown in FIG. 3.

FIG. 4 shows the second phase in the 2:1 switched-capacitor 2:1 SC voltage converter circuit shown in FIG. 3. The battery B is disconnected from the first capacitor $C_{SC}$, and the capacitor $C_{SC}$ is connected to ground. The first capacitor $C_{SC}$ is now effectively connected in parallel with the second capacitor $C_L$ and delivers its charge to the second capacitor $C_L$. The output impedance $Z_{SC}$ of the switched-capacitor 2:1 SC voltage converter is defined as:

$$Z_{SC} = \frac{1}{f \cdot C_{SC} \cdot 2}$$

Consequently, in order for the 2:1 SC voltage converter 21 to be able to provide the necessary load current $I_L$ to the load resistance 36, it needs a supply voltage of:

$$2V_{DD} + Z_{SC} \cdot I_L = 2V_{DD} + \frac{I_L}{(2f \cdot C_{SC})}.$$

Figure 5:
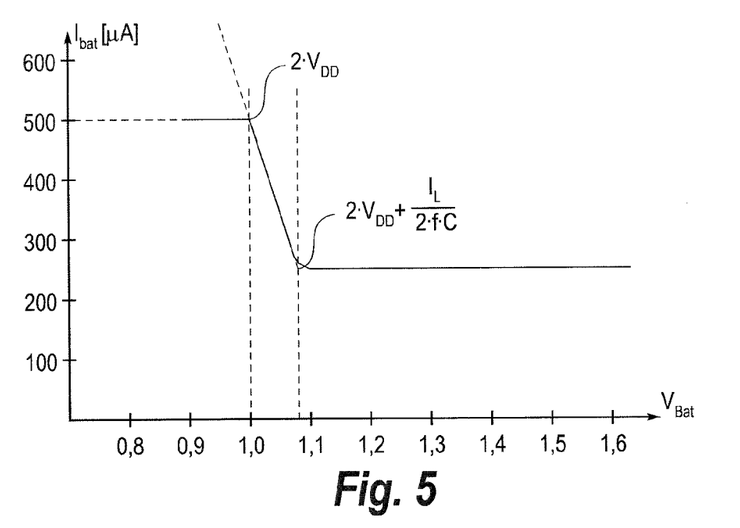
FIG. 5 is a graph showing the relationship between load current and battery voltage in a power management system.

FIG. 5 is a diagram illustrating the current $I_{bat}$ drawn from the battery as a function of the battery voltage $V_{bat}$ in the supply voltage regulator circuit in FIG. 2. The diagram is divided into three parts. The first part illustrates that the current $I_{bat}$ drawn from the battery through the second PMOS 28 shown in FIG. 2 has a value of 500 µA whenever the battery voltage $V_{bat}$ is below 1 volt. This is the result of the linear voltage regulator 20 in FIG. 2 being the sole provider of power to the hearing aid circuit.

The second part illustrates that when the battery voltage is between 1 volt and approximately 1.08 volts, the battery current $I_{bat}$ gradually drops to about 250 µA as the voltage increases, as more and more current is drawn through the first PMOS transistor 27 and the 2:1 switched-capacitor voltage converter 21 shown in FIG. 2. The reason for this decrease in current drawn from the battery is that whenever the battery voltage rises above 1 volt, the first PMOS transistor 27 and the 2:1 switched-capacitor voltage converter 21 of FIG. 2 gradually provides more and more of the available power to the digital processor core.

Prior art power management systems utilizing linear regulators have been capable of stably providing power the digital processor core, but only at a high, constant current of approximately 500 µA. At a battery voltage of about 1.08 volts, and at voltages above that up to approximately 1.6 volts, the 2:1 SC voltage converter 21 in the hearing aid of the invention provides 100% of the available power to the digital processor core, being capable of providing the necessary core voltage $V_{DD}$ of 500 mV at a total battery current load of only 250 µA. This is illustrated by the third part of the diagram in FIG. 5, which shows that the load current consumption is stable at 250 µA up to at least 1.6 volts. This relatively low battery current $I_{bat}$, even at elevated battery voltages, ensures a comparatively longer battery life thanks to the efficiency of the DC-DC voltage regulator 21 in the hearing aid of the invention.

Figure 6:
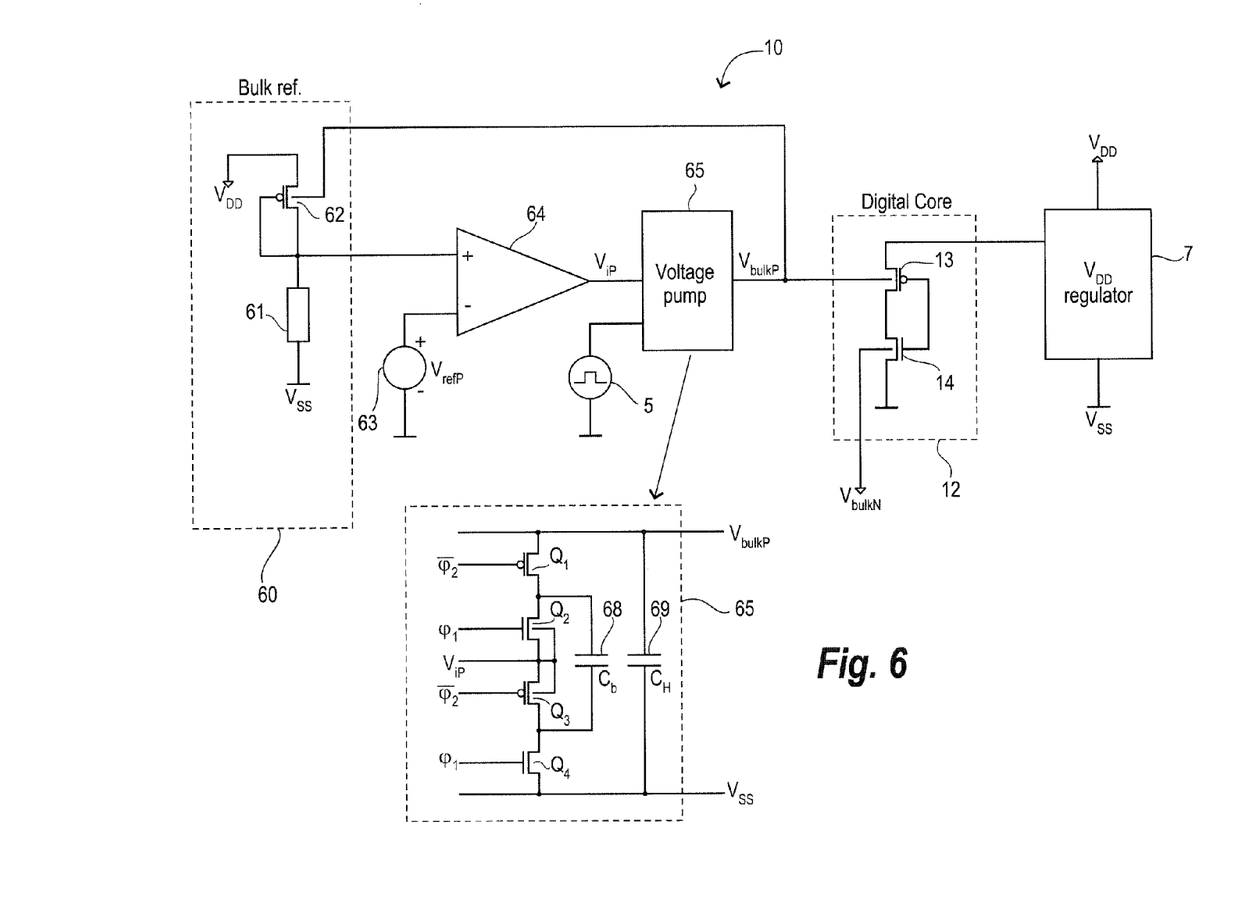
FIG. 6 is a schematic of the P bulk bias voltage regulator for the power management system shown in FIG. 1.

FIG. 6 shows a detailed view of the P bulk bias voltage regulator 10 as seen in FIG. 1. The P bulk bias voltage regulator 10 comprises a bulk reference circuit 60, an operational amplifier 64, a P reference voltage source 63, and a P voltage pump 65. The bulk reference circuit 60 comprises a reference load 61 and a reference PMOS transistor 62. The P voltage pump 65 comprises a first PMOS transistor $Q_1$, a second PMOS transistor $Q_3$, a first NMOS transistor $Q_2$, a second NMOS transistor $Q_4$, a bulk capacitor 68, and a hold capacitor 69. Further shown in FIG. 6 is the supply voltage regulator 7 and the digital processor core 12 comprising the PMOS transistor 13 and the NMOS transistor 14. The purpose of the P bulk bias voltage regulator 10 is to regulate the back bias voltage $V_{BulkP}$ to all PMOS transistors in the digital processor core 12 in order to reduce spread and current leak from the PMOS transistors, while maintaining a sufficient gain level in the PMOS transistors of the digital processor core 12.

The reference PMOS transistor 62 in the bulk reference circuit 60 acts as a current generator providing a load current to the reference load 61. The operational amplifier 64, configured as a differential amplifier stage, continuously compares the voltage potential across the reference load 61 to the voltage potential $V_{refP}$ of the P reference voltage source 63 producing a voltage potential $V_{iP}$ for the input of the P voltage pump 65. The output voltage potential $V_{BulkP}$ from the P voltage pump 65 is fed back to the well terminal of the reference PMOS transistor 62. The master clock source 5 drives the P voltage pump 65 in order for it to be capable of providing the voltage potential $V_{BulkP}$ above or below the level of the supply voltage potential $V_{DD}$. The voltage potential $V_{BulkP}$ is adjusted by the input voltage potential $V_{iP}$.

If the voltage potential across the reference load 61 falls below that of $V_{refP}$, the voltage potential $V_{iP}$ on the output of the operational amplifier 64 will fall, too, producing a lower bulk bias voltage potential $V_{BulkP}$ on the output of the P voltage pump 65. The lower bulk bias voltage potential will cause the gain and $V_t$ of the reference PMOS transistor 62 to increase, resulting in a rise in the voltage potential across the reference load 61.

In case that the voltage potential across the reference load resistance 61 rises above that of $V_{refP}$, the voltage potential $V_{iP}$ on the output of the operational amplifier 64 will also rise, producing a higher bulk bias voltage potential $V_{BulkP}$ on the output of the P voltage pump 65. The higher bulk bias voltage potential will cause the gain and $V_t$ of the reference PMOS transistor 62 to decrease, resulting in a fall in the voltage potential across the reference load resistance 61. In this way, the P bulk bias voltage regulator 10 automatically regulates the bulk bias voltage potential $V_{BulkP}$ to lie within a narrow limit, resulting in a PMOS current source with a well-defined gain value, a well-defined $V_t$, a lower spread in timing, and a limited PMOS current leak. The reference load 61 may easily be adjusted if a higher or lower bulk bias voltage potential is required.

The purpose of the voltage pump 65 is to produce the elevated bulk bias voltage potential $V_{bulkP}$ for the digital processor core 12 and the bulk reference circuit 60.

During a first phase of the clock signal from the master clock generator 5 the first and second PMOS transistors $Q_1$ and $Q_3$ are open, and the first and second NMOS transistors $Q_2$ and $Q_4$ are closed. This implies that the voltage potential $V_{iP}$ from the output of the operational amplifier 64 is on the bulk capacitor 68, and the bulk bias voltage $V_{bulkP}$ is on the hold capacitor 69. During a second phase of the clock signal from the master clock generator 5 the first and second PMOS transistors $Q_1$ and $Q_3$ are closed, and the first and second NMOS transistors $Q_2$ and $Q_4$ are open. This implies that the voltage potential $V_{bulkP}$ is on both the bulk capacitor 68 and the hold capacitor 69. Being configured as a voltage doubler, the voltage pump 65 effectively outputs a voltage of $2*V_{iP}$ as the voltage potential $V_{bulkP}$.

Figure 7:
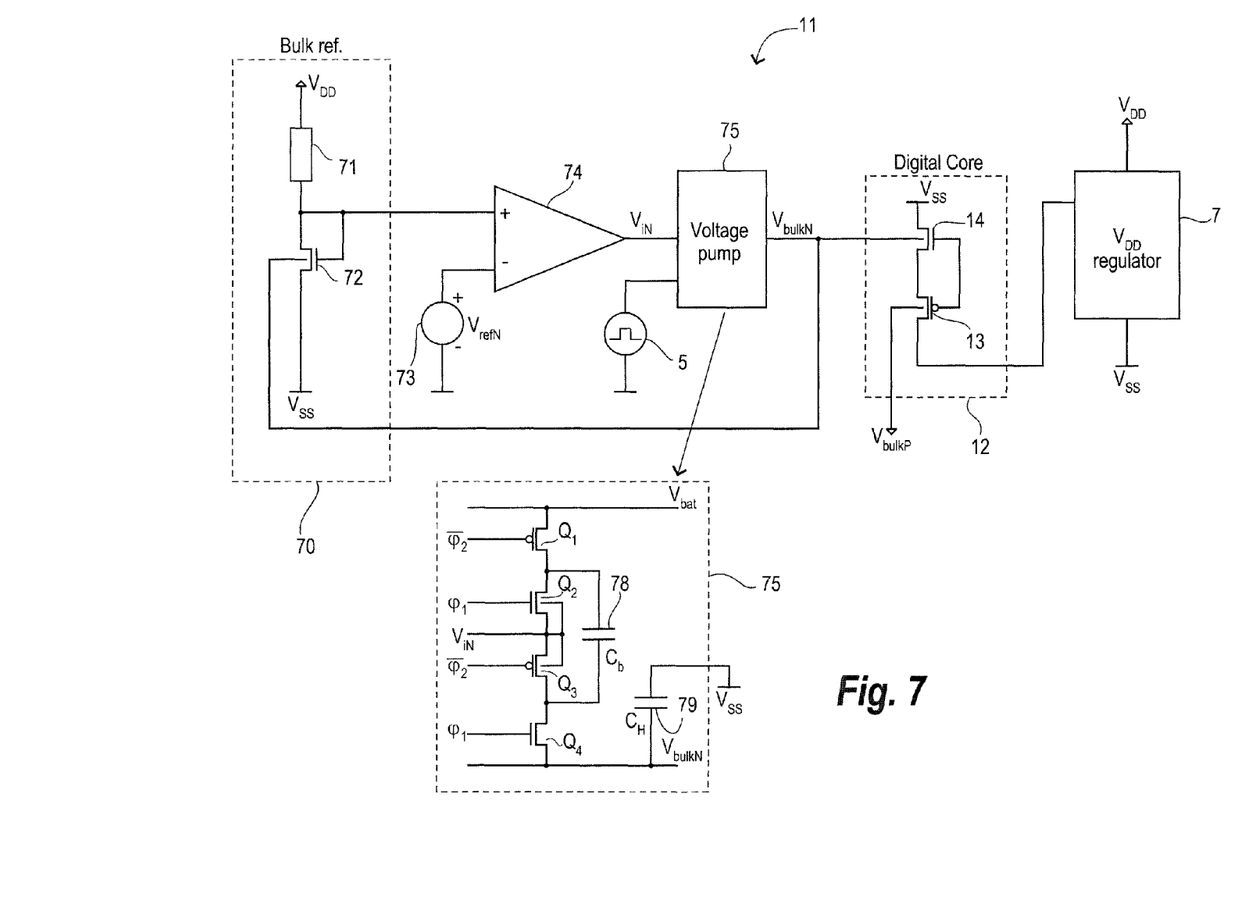
FIG. 7 is a schematic of the N bulk bias voltage regulator for the power management system shown in FIG. 1.

FIG. 7 shows a detailed view of the N bulk bias voltage regulator 11 as seen in FIG. 1. The N bulk bias voltage regulator 11 comprises a bulk reference circuit 70, an operational amplifier 74, an N reference voltage source 73, and an N voltage pump 75. The bulk reference circuit 70 comprises a reference load 71 and a reference NMOS transistor 72. The N voltage pump 75 comprises a first PMOS transistor $Q_1$, a second PMOS transistor $Q_3$, a first NMOS transistor $Q_2$, a second NMOS transistor $Q_4$, a bulk capacitor 78, and a hold capacitor 79. Further shown in FIG. 7 is the supply voltage regulator 7 and the digital processor core 12 comprising the PMOS transistor 13 and the NMOS transistor 14. The purpose of the N bulk bias voltage regulator 11 is to regulate the back bias voltage $V_{BulkN}$ to all NMOS transistors in the digital processor core 12 in order to reduce spread and current leak from the NMOS transistors, while maintaining a sufficient gain level in the NMOS transistors of the digital processor core 12. Due to the fact that the back bias voltage $V_{BulkN}$ may have to be lower than $V_{SS}$, i.e. negative, the configuration of the bulk reference circuit 70 is a bit different than the bulk reference circuit 60 shown in FIG. 6.

The reference NMOS transistor 72 in the bulk reference circuit 70 acts as a current generator providing a load current to the reference load 71. The operational amplifier 74, configured as a differential amplifier stage, continuously compares the voltage potential across the reference load 71 to the voltage potential $V_{refN}$ of the N reference voltage source 73 producing a voltage potential $V_{iN}$ for the input of the N voltage pump 75. The output voltage potential $V_{BulkN}$ from the N voltage pump 75 is fed back to the well terminal of the reference NMOS transistor 72. The master clock source 5 drives the P voltage pump 65 in order for it to be capable of providing the voltage potential $V_{BulkN}$ above or below the level of the ground voltage potential $V_{SS}$. The voltage potential $V_{BulkN}$ is adjusted by the input voltage potential $V_{iN}$.

If the voltage potential across the reference load resistance 71 rises above that of $V_{refN}$, the voltage potential $V_{iN}$ on the output of the operational amplifier 74 will rise, too, producing a higher bulk bias voltage potential $V_{BulkN}$ on the output of the N voltage pump 75. The higher bulk bias voltage potential will cause the gain and $V_t$ of the reference NMOS transistor 72 to decrease, resulting in a fall in the voltage potential across the reference load resistance 71.

In case that the voltage potential across the reference load 71 falls below that of $V_{refN}$, the error voltage potential $V_{iN}$ on the output of the operational amplifier 74 will also fall, producing a lower bulk bias voltage potential $V_{BulkN}$ on the output of the N voltage pump 75. The lower bulk bias voltage potential will cause the gain and $V_t$ from the reference NMOS transistor 72 to increase, resulting in a rise in the voltage potential across the reference load resistance 71. In this way, the N bulk bias voltage regulator 11 automatically regulates the bulk bias voltage potential $V_{BulkN}$ to lie within a narrow limit, resulting in an NMOS current source with a well-defined gain value, a well-defined $V_t$, a lower spread in timing and a limited NMOS current leak. The reference load 71 may be adjusted, in the same manner as the reference load resistance 61 in the P bulk reference circuit 60 in FIG. 6, if a higher or lower bulk bias voltage potential is required.

The purpose of the voltage pump 75 is to produce the lowered bulk bias voltage potential $V_{bulkN}$ for the digital processor core 12 and the bulk reference circuit 70. During a first phase of the clock signal from the master clock generator 5 the first and second PMOS transistors $Q_1$ and $Q_3$ are open, and the first and second NMOS transistors $Q_2$ and $Q_4$ are closed. This implies that the voltage potential $V_{iN}$ from the output of the operational amplifier 74 is on the bulk capacitor 78, and the bulk bias voltage $V_{bulkN}$ is on the hold capacitor 79. During a second phase of the clock signal from the master clock generator 5 the first and second PMOS transistors $Q_1$ and $Q_3$ are closed, and the first and second NMOS transistors $Q_2$ and $Q_4$ are open. This implies that the voltage potential $V_{bat}-V_{iN}=V_{bulkN}$ is on both the bulk capacitor 78 and the hold capacitor 79. Using the same principle of voltage doubling utilized in the voltage pump 65 in FIG. 6, the input voltage $V_{iN}$ is effectively doubled and negated by the voltage pump 75.

Figure 8:
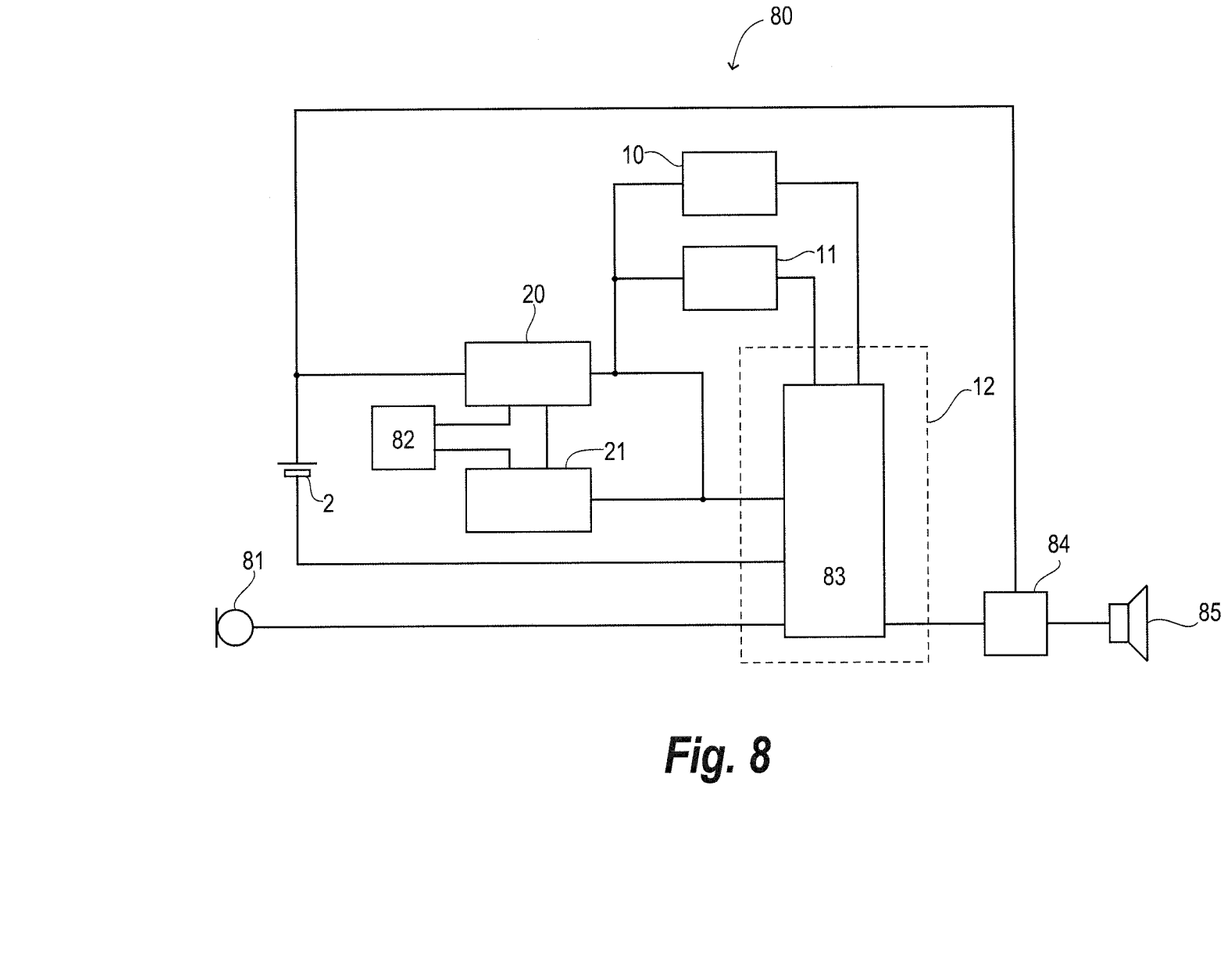
FIG. 8 is a block schematic of a hearing aid having a power management system according to the invention.

FIG. 8 is a block schematic showing the functionality of a hearing aid 80 having a power management system according to the invention. The hearing aid 80 comprises the battery 2, a microphone 81, a power supply controller 82, the linear voltage regulator 20, the switched-capacitor 2:1 SC voltage converter 21, the positive bulk bias voltage supply 10, the negative bulk bias voltage supply 11, the digital processor core 12 comprising a digital signal processor 83, an output converter 84, and an acoustical output transducer 85.

The battery 2 provides electrical energy for the linear voltage regulator 20 and the output converter 84. The power supply controller 82 controls the linear voltage regulator 20 and the 2:1 SC voltage converter 21, respectively. The power supply controller 82 enables the 2:1 SC voltage converter 21 for providing power to the digital processing core 12 when the battery voltage is sufficient. In a predetermined range of battery voltages, both the linear voltage regulator 20 and the 2:1 SC voltage converter 21 provides power to the processing core 12. If the battery voltage becomes too low, the power supply controller 82 disables the 2:1 SC voltage converter 21 in order to prevent the 2:1 SC converter 21 from draining the battery 2. The supply voltage from the linear voltage regulator 20 and the 2:1 SC voltage converter 21, respectively, also provides the necessary reference voltage for the positive bulk bias voltage supply 10 and the negative bulk bias voltage supply 11.

The positive bulk bias voltage supply 10 provides the necessary bulk bias voltage for the PMOS transistors, and the negative bulk bias voltage supply 11 provides the necessary bulk bias voltage for the NMOS transistors in order to keep the current leak from the digital processing core 12 low while keeping the gain of the MOS transistors sufficiently high to keep timing constraints.

The digital signal processor 83 forms an integral part of the digital processing core 12 and provides the processing of the signals from the microphone in order for the hearing aid to be capable of alleviating a hearing loss, as discussed earlier. The output signal from the digital signal processor 83 is amplified by the output converter 84 and converted into an acoustical signal by the acoustic output transducer 85 for acoustic reproduction. The parts of the digital processing core 12 not forming part of the digital signal processor 83 takes care of e.g. bootstrap operations at startup, program storage, communication with an external programming device (not shown), and other tasks unrelated to the direct processing of audio signals.

In a typical prior art power supply for a hearing aid powered by a battery having a long-term average voltage of 1.2 volts, a linear voltage regulator and operating at a digital processing core voltage of 0.7 volts, about 60% of the total power is consumed by the digital processing core, while the remaining 40% of the total power is consumed by the linear voltage regulator.

In a preferred embodiment of the power management circuit of the invention, powering a digital processing core at a voltage of 0.5 volts, the total power consumption may be reduced to about 70% when powered solely by the linear voltage regulator as compared to the total power consumption of the typical prior art power supply, and to about 35%-37% when powered by the switched-capacitor 2:1 SC voltage converter. In comparison, the digital core consumes only 30% of the total power in the hearing aid when operating at 0.5 volts, and as the linear voltage regulator takes over gradually only when the battery voltage gets below 1.08 volts, the low power consumption is achieved throughout most of the useful battery life.

I claim:

1. A hearing aid having:
   a battery,
   a microelectronic circuit, said circuit comprising PMOS transistors and NMOS transistors,
   a power supply powered by the battery and providing a supply voltage on at least one of first and second output branches,
   the power supply having a controller for comparing the battery voltage against first and second predetermined levels and causing the power supply to provide the supply voltage (i) by the first output branch when the battery voltage is below the first level, (ii) by the first output branch in combination with the second output branch when the battery voltage is between the first and second levels, and (iii) by the second output branch when the battery voltage is above the second level.

2. A hearing aid according to claim 1, wherein the PMOS transistors and NMOS transistors of the microelectronic circuit are included in a digital processing core.

3. A hearing aid according to claim 1, wherein the first output branch of the power supply comprising a first linear voltage regulator.

4. A hearing aid according to claim 3, wherein the second output branch of the power supply comprising a second linear voltage regulator in series with a 2:1 switched-capacitor voltage converter.

5. The hearing aid according to claim 4, characterized in that the microelectronic circuit comprises a master clock generator adapted for providing a clock signal for driving the 2:1 switched-capacitor voltage converter.

6. A hearing aid according to claim 1, wherein the power supply Includes a positive bulk biasing voltage generator and a negative bulk biasing voltage generator supplying power to the microelectronic circuit.

7. A hearing aid according to claim 6, wherein the positive bulk biasing voltage generator being adapted for providing a bias voltage to the positive bulk of the PMOS transistors of the microelectronic circuit.

8. The hearing aid according to claim 7, characterized in that the positive bulk biasing voltage generator comprises a first voltage pump capable of providing an output bias voltage potential higher than the supply voltage for the PMOS transistors of the microelectronic circuit.

9. The hearing aid according to claim 8, characterized in that the microelectronic circuit comprises a master clock generator adapted for providing a clock signal for driving the first voltage pump.

10. A hearing aid according to claim 6, wherein the negative bulk biasing voltage generator providing a bias voltage to the negative bulk of the NMOS transistors of the microelectronic circuit.

11. The hearing aid according to claim 10, characterized in that the negative bulk biasing voltage generator comprises a second voltage pump capable of providing an output bias voltage potential lower than a zero voltage reference potential for the NMOS transistors of the microelectronic circuit.

12. The hearing aid according to claim 11, characterized in that the microelectronic circuit comprises a master clock generator adapted for providing a clock signal for driving the second voltage pump.

13. The hearing aid according to claim 1, characterized in that the PMOS transistors and the NMOS transistors of the microelectronic circuit are adapted for operating at a nominal supply voltage of 0.5 volts.

14. A hearing aid having
   a microelectronic circuit comprising PMOS transistors and NMOS transistors,
   a battery,
   a power supply powered by the battery and providing a supply voltage via at least one of (i) a first linear voltage regulator and (ii) a second linear voltage regulator in series with a 2:1 switched-capacitor voltage converter,
   the power supply having a controller for comparing the battery voltage against first and second predetermined levels and causing the power supply to provide the supply voltage (i) by the first linear voltage regulator when the battery voltage is below the first level, (ii) by the first linear voltage regulator in combination with the second linear voltage regulator in series with a 2:1 switched-capacitor voltage converter when the battery voltage is between the first and second levels, and (iii) by the second linear voltage regulator in series with a 2:1 switched-capacitor voltage converter when the battery voltage is above the second level, and
   the power supply provides the supply voltage as input to:
      a positive bulk biasing voltage generator comprising a first voltage pump capable of providing an output bias voltage potential higher than the supply voltage for the PMOS transistors of the microelectronic circuit, and
      a negative bulk biasing voltage generator comprising a second voltage pump capable of providing an output bias voltage potential lower than a zero voltage reference potential for the NMOS transistors of the microelectronic circuit.

15. A method of providing a supply voltage to a digital hearing aid having a battery and a microelectronic circuit including PMOS transistors and NMOS transistors, said method comprises steps of:
   providing a supply voltage on at least one of first and second output branches,
   comparing the battery voltage against first and second predetermined levels and causing the power supply to provide the supply voltage (i) by the first output branch when the battery voltage is below the first level, (ii) by the first output branch in combination with the second output branch when the battery voltage is between the first and second levels, and (iii) by the second output branch when the battery voltage is above the second level.

16. The method according to claim 15, wherein the supply voltage on said first branch is provided by means of a first linear voltage regulator.

17. The method according to claim 15, wherein the supply voltage on said second branch is provided by means of a second linear voltage regulator in series with a 2:1 switched-capacitor voltage converter.

18. The method according to claim 15, wherein the provided supply voltage is applied as a first bulk biasing voltage to a first bulk terminal of the hearing aid circuit, and a second bulk biasing voltage to a second bulk terminal of the hearing aid circuit.

* * * * *